UNITED STATES PATENT OFFICE.

HEINRICH JORDAN AND WILHELM NEELMEIER, OF LEVERKUSEN, GERMANY, ASSIGNORS TO SYNTHETIC PATENTS CO., INC., OF NEW YORK, N. Y., A CORPORATION OF NEW YORK.

RED AZO DYE.

*To all whom it may concern:*

Be it known that we, HEINRICH JORDAN and WILHELM NEELMEIER, doctors of philosophy, chemists, citizens of the German Empire, residing at Leverkusen, near Cologne, Germany, have invented new and useful Improvements in New Red Azo Dyes, of which the following is a specification.

We have found that new and valuable azo dyestuffs can be obtained by combining the diazo compounds prepared from para-aminobenzoyl-para-aminosalicylic acid compounds, such as para-aminobenzoyl-para-amino-salicylic acid, para-aminobenzoyl-para-amino-sulfo-salicylic acid, para-amino-benzoyl-para-amino-chloro-salicylic acid, para-amino-benzoyl-para-amino-cresotinic acids, etc., with acidyl-2-amino-5-naphthol-7-sulfonic acids, such as 2-acetylamino-5-naphthol-7-sulfonic acid, 2-benzoylamino-5-naphthol-7-sulfonic acid, para-aminobenzoyl-2-amino-5-naphthol-7-sulfonic acid or other acidyl compounds, such as phthaloxyl-, nitrobenzoyl-, meta-aminobenzoyl-, aminobenzoyl-aminobenzoyl-derivatives.

The new dyes are after being dried and pulverized in the shape of their alkaline salts dark red powders soluble in water generally with an orange to red coloration and in concentrated sulfuric acid with a red to bluish-red coloration and yielding upon reduction with acetic acid and zinc powder a para-amino-benzoyl-para-aminosalicylic acid compound and a 2-acidylamino-5-naphthol-6-amino-7-sulfonic acid. They dye cotton clear red shades fast to light.

In order to illustrate the new process more fully the following example is given, the parts being by weight:—286 parts of para-aminobenzoyl-para-amino-ortho-cresotinic acid are dissolved in 10000 parts of water and 53 parts of soda, reprecipitated with 300 parts of hydrochloric acid (19½° Bé.) and diazotized with 69 parts of sodium nitrite in 100 parts of water at 20–25° C. The diazo compound thus obtained is then stirred into a cold solution of 482 parts of the disodium salt of para-sulfaminobenzoyl-2-amino-5-naphthol-7-sulfonic acid containing 120 parts of soda. When the combination is complete the mixture of the reaction is acidulated and the dyestuff is salted out and filtered off. It is after being dried and pulverized in the shape of its sodium salt a dark red powder soluble in water with a yellowish-red coloration and in concentrated sulfuric acid with a red-blue coloration; and yielding upon reduction with zinc powder and acetic acid para-aminobenzoyl-para-amino-ortho-cresotinic acid and para-sulfaminobenzoyl-2-amino-5-naphthol-6-amino-7-sulfonic acid. It has in a free state most probably the formula:

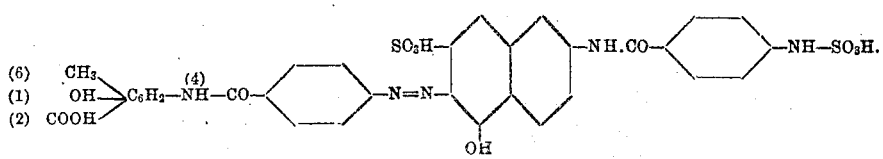

It dyes cotton clear yellowish-red shades fast to light. It can be diazotized on fiber (the sulfonic group being split off from the NH$_2$ group) and developed with beta-naphthol by which treatment the shades turn bluer and fast to washing. The dye obtained from para-aminobenzoyl-2.5.7-aminonaphthol sulfonic acid has similar properties.

We claim:—

1. The new azo dyestuffs derived from a diazo compound of a para-aminobenzoyl-para-aminosalicylic acid compound and an acidyl derivative of 2-amino-5-naphthol-7-sulfonic acid and being after being dried and pulverized in the shape of their alkaline salts dark powders soluble in water generally with an orange to red coloration and in concentrated sulfuric acid generally with a red to bluish-red coloration; yielding upon reduction with acetic acid and zinc powder a para-aminobenzoyl-para-amino-salicylic acid compound and a 2-acidylamino-5-naphthol-6-amino-7-sulfonic acid and furnishing on cotton fiber clear red shades fast to light and to soap, substantially as described.

2. The new azo dyestuff having in a free state most probably the formula:

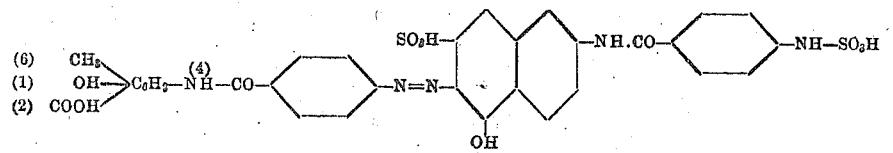

which is after being dried and pulverized in the shape of its sodium salt a dark red powder soluble in water with a yellowish-red coloration and in concentrated sulfuric acid with a red-blue coloration; yielding upon reduction with acetic acid and zinc powder para-aminobenzoyl-para-amino-ortho-cresotinic acid and para-sulfaminobenzoyl-2-amino-5-naphthol-6-amino-7-sulfonic acid; furnishing when dyed on the cotton fiber clear yellowish-red shades fast to light which can be diazotized on fiber and developed with beta-naphthol, shades fast to washing being thus obtained, substantially as described.

In testimony whereof we have hereunto set our hands in the presence of two subscribing witnesses.

HEINRICH JORDAN. [L. S.]
WILHELM NEELMEIER. [L. S.]

Witnesses:
 HELEN NUFER,
 ALBERT NUFER.